United States Patent [19]

Eichenauer et al.

[11] Patent Number: 4,859,731
[45] Date of Patent: Aug. 22, 1989

[54] POLYMERIC DIHYDROXY COMPOUNDS AND THEIR USE AS STABILIZERS FOR POLYMERS

[75] Inventors: Herbert Eichenauer, Dormagen; Hartwig Höcker, Aachen; Thomas Heitz, Alsdorf, all of Fed. Rep. of Germany

[73] Assignee: Bayer Aktiengesellschaft, Leverkusen, Fed. Rep. of Germany

[21] Appl. No.: 223,541

[22] Filed: Jul. 25, 1988

[30] Foreign Application Priority Data

Aug. 4, 1987 [DE] Fed. Rep. of Germany ....... 3725848

[51] Int. Cl.$^4$ .................. C07C 59/52; C07C 39/19; C07C 39/08; C08F 8/02; C08K 5/13
[52] U.S. Cl. .................. 524/291; 524/347; 525/333.3; 525/333.7; 560/55; 568/763; 568/766
[58] Field of Search .............. 525/149, 359.4, 333.3, 525/333.7; 524/346, 347, 349, 351, 350, 352, 353, 291; 568/744, 766, 763, 780; 560/55

[56] References Cited

U.S. PATENT DOCUMENTS

| | | | |
|---|---|---|---|
| 2,455,746 | 12/1948 | Erickson | 568/780 |
| 2,553,470 | 5/1951 | Pines et al. | 568/766 |
| 2,682,563 | 6/1954 | Knowles et al. | 568/766 |
| 3,331,879 | 7/1967 | Leston | 568/766 |
| 3,413,347 | 11/1968 | Worrel | 568/780 |
| 3,424,821 | 1/1969 | Hunter | 568/766 |
| 3,646,222 | 2/1972 | Kawamatsu et al. | 568/766 |
| 3,766,276 | 10/1973 | Goddard | 568/744 |
| 3,845,143 | 10/1974 | Wollensak | 568/744 |
| 4,054,676 | 10/1977 | Weinshenker | 524/343 |
| 4,307,012 | 12/1981 | Serres | 524/347 |
| 4,353,836 | 10/1982 | Horner et al. | 560/55 |
| 4,594,460 | 6/1986 | Mignani et al. | 568/744 |
| 4,616,082 | 10/1986 | Howell | 560/55 |

Primary Examiner—Veronica P. Hoke
Attorney, Agent, or Firm—Connolly and Hutz

[57] ABSTRACT

Polymer dihydroxy compounds corresponding to the following formula

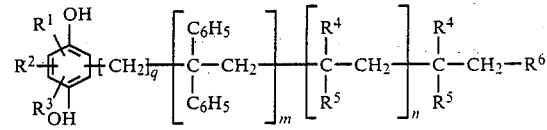

in which $R^1$, $R^2$, $R^3$ = H or $C_1$-$C_4$ alkyl, $R^4$ = H or $C_1$-$C_4$ alkyl, $R^5$ = —$C_6H_5$, —$C_6H_4CH_3$, —CH=$CH_2$, or —$CO_2R^7$, $R^6$ = $C_1$-$C_4$ alkyl, aryl, or H, $R^7$ = $C_1$-$C_4$ alkyl, m = 0 or 1, n = 5 to 100, q = 0 or 1, a process for their production and their use in thermoplastic molding compositions.

6 Claims, No Drawings

POLYMERIC DIHYDROXY COMPOUNDS AND THEIR USE AS STABILIZERS FOR POLYMERS

This invention relates to polymeric dihydroxy compounds, to a process for their production and to polymers finished with these dihydroxy compounds.

Under the effect of oxygen, heat or light, synthetic polymers, particularly those containing unsaturated bonds in the molecule chain, undergo degradation reactions which lead to a deterioration in their properties and to problems in the practical application of parts made from the polymers.

Numerous stabilizers for polymers have already been proposed with a view to forestalling such degradation, including in particular compounds containing phenolic hydroxyl groups (cf. for example R. Gächter and H. Müller: Taschenbuch der Kunststoff-Additive, Carl-Hanser-Verlag München, Wien 1979).

It has now been found that polymeric compounds containing phenolic hydroxyl groups and corresponding to formula (I) below are particularly effective as stabilizers, combining high compatability with polymers with, in particular, low volatility.

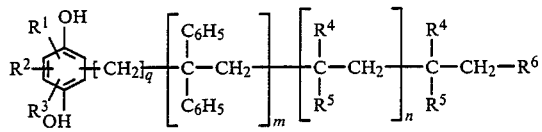

In formula (I):

$R^1$, $R^2$, $R^3$ = H or $C_1$-$C_4$ alkyl, $R^4$ = H or $C_1$-$C_4$ alkyl, $R^5$ = —$C_6H_5$, —$C_6H_4CH_3$, —CH=$CH_2$ or —$CO_2R^7$, $R^6$ = $C_1$-$C_4$ alkyl or aryl, $R^7$ = $C_1$-$C_4$ alkyl, m = 0 or 1, n = 5 to 100 q = 0 or 1.

The present invention relates to polymeric dihydroxy compounds corresponding to formula (I) which have a degree of polymerization of from 5 to 100, preferably from 5 to 30 and more preferably from 10 to 25.

The invention also relates to a process for the production of these polymeric dihydroxy compounds via the following stages:

1. anionic polymerization of anionically polymerizable vinyl monomers, optionally
2. reaction of the living anion with 1,1-diphenyl ethylene to reduce reactivity,
3. reaction of the resulting product with a compound corresponding to the following formula

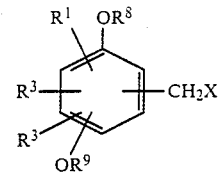

$R^8$, $R^9$ = $C_1$-$C_4$ alkyl or —$SiR^{10}R^{11}R^{12}$, $R^{10}$, $R^{11}$, $R^{12}$ = $C_1$-$C_4$ alkyl or —$C_6H_5$, X = Cl, Br or I, 4. isolation of the resulting polymer and
5. elimination of the protective groups $R^8$ and $R^9$.

Anionically polymerizable vinyl monomers are polymerized in an aromatic solvent or an ether using an alkyl alkali metal or aryl alkali metal compound to form a living polymeric anion, 1,1-diphenyl ethylene is optionally added to reduce the reactivity of the polymeric anion, followed by reaction with a benzyl halide (II) and then by ether cleavage or elimination of trialkyl silyl groups to form the hydroxyl groups.

Anionically polymerizable vinyl monomers in the context of the invention are, for example, styrene, p-methyl styrene, α-methyl styrene, butadiene, isoprene, methyl methacrylate or mixtures thereof. The preferred monomer is styrene.

Aromatic solvents in the context of the invention are benzene, toluene; ethers in the context of the invention are tetrahydrofuran and dioxane, particularly tetrahydrofuran ("THF"). To obtain certain molecular weights, the reaction may also be carried out in mixtures of aromatic hydrocarbons and ethers.

Alkyl alkali metal compounds in the context of the invention are butyl lithium, particularly secondary butyl lithium, while aryl alkyl metal compounds in the context of the invention are preferably Na-naphthalene, K-naphthalene or phenyl lithium.

Compounds corresponding to formula (II) are, for example, 2,5-dimethoxybenzyl chloride, 2,5-dimethoxybenzyl bromide, 2,5-dimethoxybenzyl iodide, 2,6-dimethoxybenzyl bromide, 2,4-dimethoxybenzyl bromide, 2,3-dimethoxybenzyl bromide, 2,5-di-(trimethylsilyloxy)-benzyl bromide, 2,4-di-(trimethylsilyloxy)-benzyl bromide, 2,5-dimethoxy-3-methyl benzyl bromide, 2,5-dimethoxy-3,4-dimethyl benzyl bromide. 2,5-Dimethoxybenzyl bromide is preferred.

The polymerization and the reaction with the compound (II) are best carried out at a temperature of from −100° C. to 60° C. and preferably at a temperature of from room temperature to 0° C.

Since the process according to the invention involves the use of so-called living anions, it is of course important to maintain conditions which do not adversely affect the living anions, for example inert, water-free conditions. Such conditions are state-of-the-art.

The resulting polymers may be isolated by precipitation from the polymer solution, preferably using methanol.

The protective groups are preferably eliminated in solution using suitable reagents.

This may be done, for example, by treatment of the polymer dissolved in chloroform with trimethyl iodosilane or by treatment of the polymer dissolved in a mixture of acetonitrile and toluene with a mixture of trimethyl chlorosilane and sodium iodide or by a treatment of the polymer with an acid or rather a Lewis acid, for example boron tribromide.

The resulting polymers have degrees of polymerization, controllable through the quantity of initiator, of from 5 to 100.

The present invention also relates to the use of the polymeric dihydroxy compounds corresponding to formula (I) as stabilizers in the stabilization of synthetic polymers, sulfur-containing or phosphorus-containing compounds being additionally useable as co-stabilizers.

The compounds according to the invention are particularly effective in the stabilization of rubbers, for example polybutadiene, polyisoprene, polychloroprene, styrene-butadiene copolymers, acrylonitrile-butadiene copolymers, acrylate rubbers, ethylene-propylene rubbers or EPDM rubbers (ethylene/propylene/diene rubbers which contain an unconjugated diene, such as for example 1,5-hexadiene or norbornadiene, in small quantities as diene), in the stabilization of thermoplasts, for example polyethylene, polypropylene, polystyrene, polymethyl methacrylate, styrene/acrylonitrile copolymers, polycarbonate, polyamide, polyesters and, particularly, rubber-modified thermoplasts, for example acrylonitrile/butadiene/styrene terpolymers (ABS), methyl methacrylate/butadiene/styrene terpolymers (MBS), high-impact polystyrene (HIPS) or ABS/polycarbonate mixtures.

Suitable co-stabilizers are, for example, dilauryl thiodipropionate or trisnonyl phenyl phosphite.

In general, from 0.1 to 10 parts by weight, preferably from 0.25 to 5 parts by weight and more preferably from 0.5 to 4 parts by weight polymer containing aromatic hydroxyl groups are added per 100 parts by weight of polymer to be stabilized.

The polymer containing aromatic hydroxyl groups may be added to the polymer material in solid form, in solution or in the form of a dispersion or emulsion.

Depending on the form of the polymer to be stabilized, the stabilizers are incorporated on kneaders, rolls, in emulsion or in solution.

EXAMPLES AND COMPARISON EXAMPLES

Parts are always parts by weight.

EXAMPLE 1

Preparation of 2,5-dimethoxybenzyl bromide:

2,5-Dimethoxybenzyl bromide was prepared by a modified method described by A. L. Shulgin and E. M. Gal in J. Chem. Soc. (London), 1316 (1953).

A solution of 4.35 ml (46.3 mmol) $PBr_3$ in 60 ml $CCl_4$ was added dropwise over a period of 1 hour while cooling with ice to a solution of 20 ml (138.9 mmol) 2,5-dimethoxybenzyl alcohol in 200 ml dry $CCl_4$ and the resulting mixture stirred for 15 h at 20° C. in the absence of moisture. After decantation of the $CCl_4$ phase and washing of the inorganic phase (phosphorous acid) with $CCl_4$, the combined organic phases were chromatographed on neutral aluminium oxide (Alumina Woelm N-Super I) and concentrated. The crude product was purified by sublimation in a high vacuum (T=80°–100° C.; 0.1 mbar); white needles (melting point 74.5° C., as measured with a Perkin Elmer DSC 7) (lit. 75°–76° C.). Yield 20.2 g=45% of the theoretical.

EXAMPLE 2

Reaction of a living polystyryl anion with 1,1-diphenyl ethylene and then with 2,5-dimethoxybenzyl bromide:

11.5 mol (0.1 mol) styrene were added by syringe to a mixture of 120 ml toluene and 10 ml THF, followed by cooling with an ice bath. The addition of 5 mmol sec.-butyl lithium in cyclohexane/isopentane with rapid stirring produced by a momentary discoloration to cherry red (orange-red in pure toluene). After the vigorous evolution of heat had abated (approx. 3 mins), the solution was stirred for 2 h at room temperature. 6 mmol 1,1-diphenyl ethylene were then added, producing a red-violet coloration. After stirring for another hour, the solution was taken up by syringe and added dropwise with rapid stirring to a solution of 2.31 g (10 mmol) of the 2,5-dimethoxybenzyl bromide described in Example 1 in 100 ml toluene. The polymer was isolated by dropwise addition of the reaction solution to 1,000 ml nitrogen-saturated methanol.

EXAMPLE 3

Ether cleavage with iodotrimethyl silane:

1.65 ml (11.64 mmol) $Me_3SiI$ were added under an inert gas to a solution of 10.39 g (4.478 mmol) of the polymer described in Example 2 in 60 ml $CHCl_3$ (freed from ethanol over Alumina Woelm b) and the brown-violet colored solution was stirred for 72 h in an inert gas atmosphere. After addition of 10 ml $H_2O$, the solution was stirred for another 24 h, after which the product was precipitated by dropwise addition to 800 ml methanol. The yellow product was dissolved in 30 ml chloroform and vigorously shaken for 60 minutes with a solution of 3 g $Na_2S_2O_4$ in 20 ml water. The precipitation of the polymer in methanol produced a white solid which, after dissolution in and reciprocation from THF and intensive washing with $H_2O$/methanol, was dried in a high vacuum. Yield: 8.29 g=79.8% of the theoretical.

EXAMPLE 4

Performance testing in polypropylene:

Standard commercial polypropylene granulate is extracted with methylene chloride for 8 h in a Soxhlet apparatus to remove the stabilizer present, followed by drying in vacuo for 12 h.

Using a laboratory kneader, the stabilizer to be tested is incorporated in the melt over a period of 4 minutes at 200° C. The polypropylene is then compression-molded to 0.5 mm thick sheets (7 mins at 200° C./10 bar, followed by cooling under pressure for 10 mins). Triplicates are stored at 150° C. in a recirculating-air cabinet. The period of time elapsing before the onset of oxidative destruction (browning, embrittlement) is measured. The results of the ageing tests are shown in Table 1.

TABLE 1

| Quantity of polymer of Example 3 added (parts by weight per 100 parts by weight polypropylene) | Time to destruction (days) |
| --- | --- |
| — | 6 |
| 0.5 | 27 |
| 1.0 | 29 |

EXAMPLE 5

Performance testing in ABS:

100 parts of a graft rubber powder, which had been prepared by emulsion polymerization of a mixture of 36 parts by weight styrene and 14 parts by weight acrylonitrile in the presence of 50 parts by weight of a polybutadiene present in latex form with an average particle diameter, as measured by light scattering, of 0.35 μm and subsequent coagulation using a 1% aqueous solution of a 1:1 mixture of acetic acid and magnesium sulfate, followed by drying in vacuo at room temperature, were mixed in a laboratory kneader (a) without addition of a stabilizer
(b) with 0.5 part of the polymer of Example 3,
(c) with 1.0 part of the polymer of Example 3, and then compression-molded in a heating press for 3 minutes at 160° C./200 bar to form sheets having a thickness of approx. 0.16 mm.

Dynamic DSC measurements (heating rate: 20 K/min, purging gas: $O_2$ 3.6 l/h, measuring apparatus: Perkin Elmer DSC 2) and isothermal DSC measurements at 150° C. (purging gas oxygen 3.6 l/h) were conducted on the sheets, the results being shown in Table 2.

TABLE 2

| Quantity of polymer of Example 3 (parts by weight per 100 parts by weight graft rubber) | Beginning of the exothermic reaction (°C.) (dynamic DSC) | Induction time to maximum oxidation rate [mins] (isothermal DSC) |
| --- | --- | --- |
| — | 186 | 6 |
| 0.5 | 198.5 | 16 |
| 1.0 | 200 | 18 |

We claim:

1. Polymeric dihydroxy compounds corresponding to the following formula $$\begin{array}{c} R^1 \ OH \\ R^2 \underset{R^3}{\underset{|}{\bigcirc}} \ [CH_2]_q \left[ \begin{array}{c} C_6H_5 \\ | \\ C-CH_2 \\ | \\ C_6H_5 \end{array} \right]_m \left[ \begin{array}{c} R^4 \\ | \\ C-CH_2 \\ | \\ R^5 \end{array} \right]_n \begin{array}{c} R^4 \\ | \\ C-CH_2-R^6 \\ | \\ R^5 \end{array} \\ OH \end{array}$$

in which $R^1$, $R^2$, $R^3$ = H or $C_1-C_4$ alkyl, $R^4$ = H or $C_1-C_4$ alkyl, $R^5 = -C_6H_5$, $-C_6H_4CH_3$, $-CH=CH_2$ or $-CO_2R^7$, $R^6 = C_1-C_4$ alkyl, aryl or H, $R^7 = C_1-C_4$ alkyl, m = 0 or 1 n = 5 to 100, q = 0 or 1.

2. Synthetic polymers containing as a stabilizer 0.1 to 10% by weight of a polymeric dihydroxy compound according to claim 1.

3. Synthetic polymers according to claim 2 which additionally contain a sulfur-containing or phosphorus-containing co-stabilizer.

4. Synthetic polymers according to claim 2 wherein the polymer is a thermoplastic material.

5. Synthetic polymers according to claim 2 wherein the polymer is a rubber.

6. A process for the production of the polymeric dihydroxy compounds corresponding to formula (I)

$$\begin{array}{c} R^1 \ OH \\ R^2 \underset{R^3}{\underset{|}{\bigcirc}} \ [CH_2]_q \left[ \begin{array}{c} C_6H_5 \\ | \\ C-CH_2 \\ | \\ C_6H_5 \end{array} \right]_m \left[ \begin{array}{c} R^4 \\ | \\ C-CH_2 \\ | \\ R^5 \end{array} \right]_n \begin{array}{c} R^4 \\ | \\ C-CH_2-R^6 \\ | \\ R^5 \end{array} \\ OH \end{array} \quad (I)$$

in which $R^1$, $R^2$, $R^3$ = H or $C_1-C_4$ alkyl, $R^4$ = H or $C_1-C_4$ alkyl, $R^5 = -C_6H_5$, $-C_6H_4CH_3$, $-CH=CH_2$ or $-CO_2R^7$, $R^6 = C_1-C_4$ alkyl, aryl or H, $R^7 = C_1-C_4$ alkyl, m = 0 or 1 n = 5 to 100, q = 0 or 1, characterized in that
(a) a suitable vinyl monomer is anionically polymerized,
(b) the living anion is optionally polymerized with 1,1-diphenyl ethylene,
(c) the resulting product is reacted with a compound corresponding to the following formula $$\begin{array}{c} R^1 \ OR^8 \\ R^3 \underset{R^3}{\underset{|}{\bigcirc}} CH_2X \\ OR^9 \end{array}$$

$R^8$, $R^9 = C_1-C_4$ alkyl or $-SiR^{10}R^{11}R^{12}$, $R^{10}$, $R^{11}$, $R^{12} = C_1-C_4$ alkyl or $-C_6H_5$, X = Cl, Br or I,
(d) the resulting polymer is isolated and
(e) the protective groups $R^8$ and $R^9$ are eliminated.

* * * * *